United States Patent
Morris et al.

(10) Patent No.: US 6,573,936 B2
(45) Date of Patent: Jun. 3, 2003

(54) METHOD AND APPARATUS FOR PROVIDING A SINGLE-INSTRUCTION MULTIPLE DATA DIGITAL CAMERA SYSTEM THAT INTEGRATES ON-CHIP SENSING AND PARALLEL PROCESSING

(75) Inventors: Tonia G. Morris, Chandler, AZ (US); Kevin M. Connolly, Chandler, AZ (US); Jean-Charles W. Korta, Phoenix, AZ (US); Cyrus M. Afghahi, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/135,130

(22) Filed: Aug. 17, 1998

(65) Prior Publication Data

US 2003/0058345 A1 Mar. 27, 2003

(51) Int. Cl.$^7$ ................................................ H04N 3/14
(52) U.S. Cl. ........................ 348/294; 348/302; 348/308
(58) Field of Search ................................ 348/294, 298, 348/302, 308, 241; 382/218; 345/100

(56) References Cited

U.S. PATENT DOCUMENTS

| | | | | | |
|---|---|---|---|---|---|
| 5,665,959 A | * | 9/1997 | Fossum et al. | ............. | 348/298 |
| 5,926,214 A | * | 7/1999 | Denyer et al. | ............... | 348/241 |
| 5,933,530 A | * | 8/1999 | Kim | ............................ | 382/218 |
| 5,973,661 A | * | 10/1999 | Kobayashi et al. | ........... | 345/100 |
| 6,084,635 A | * | 7/2000 | Nakamura | ................... | 348/308 |
| 6,115,066 A | * | 9/2000 | Gowda et al. | ............... | 348/308 |
| 6,133,862 A | * | 10/2000 | Dhuse et al. | ................ | 348/294 |
| 6,344,877 B1 | * | 2/2002 | Gowda et al. | ............... | 348/308 |

* cited by examiner

Primary Examiner—Wendy R. Garber
Assistant Examiner—Luong Nguyen
(74) Attorney, Agent, or Firm—Blakely, Sokoloff, Taylor & Zafman LLP

(57) ABSTRACT

A single-chip digital camera system is described. In one embodiment, the single-chip digital camera system includes a sensor array including rows and columns of discrete sensor elements, corresponding analog-to-digital converters to convert analog values into digital data, a storage element coupled to the analog-to-digital converters, to store the digital data, and a plurality of arithmetic logic units coupled to the storage element, to operate on the digital data. The digital camera system also includes a switching matrix Which is coupled between the array of analog-to-digital converters and the memory element. The switching matrix spatially rotates the analog-to-digital converter outputs for storing such outputs in the memory element.

25 Claims, 6 Drawing Sheets

METHOD AND APPARATUS FOR PROVIDING A SINGLE-INSTRUCTION MULTIPLE DATA DIGITAL CAMERA SYSTEM THAT INTEGRATES ON-CHIP SENSING AND PARALLEL PROCESSING

BACKGROUND OF THE INVENTION

1. Field of the Invention

The present invention relates generally to the field of digital camera systems, and specifically, to a single-instruction multiple data digital camera system that integrates on-chip sensing and parallel processing.

2. Background Information

Sensor arrays that discretely sample images are becoming increasingly popular in digital cameras and camcorders. A complementary metal-oxide semiconductor ("CMOS") sensor array typically includes an array of pixel sensors that discretely sample an image. The output of each pixel sensor is fed to an on-chip analog-to-digital converter which receives the analog samples and converts them into a digital bit stream. The digital bit stream is routed off-chip to a host system which operates on the data, as required by a particular application. For example, the digital bit stream that makes up an image may be manipulated for enhancing the image or may be compressed and stored in memory.

However, this type of digital camera system has several drawbacks. First, the digital bit stream coming off-chip demands a high bandwidth communication channel, requiring a high bandwidth, external device to receive the digital bit stream. Second, the host processor is burdened with performing a considerable amount of processing such as image filtering, compression, etc., which reduces the bandwidth of the host processor for performing other tasks. Moreover, storage requirements for portable digital cameras become prohibitive.

SUMMARY OF THE INVENTION

A single-chip digital camera system is described. In one embodiment, the single-chip digital camera system comprises a sensor array including rows and columns of discrete sensor elements, corresponding analog-to-digital converters to convert analog values into digital data, a storage element coupled to the analog-to-digital converters, to store the digital data, and a plurality of arithmetic logic units coupled to the storage element, to operate on the digital data.

DETAILED DESCRIPTION

Figure 1:
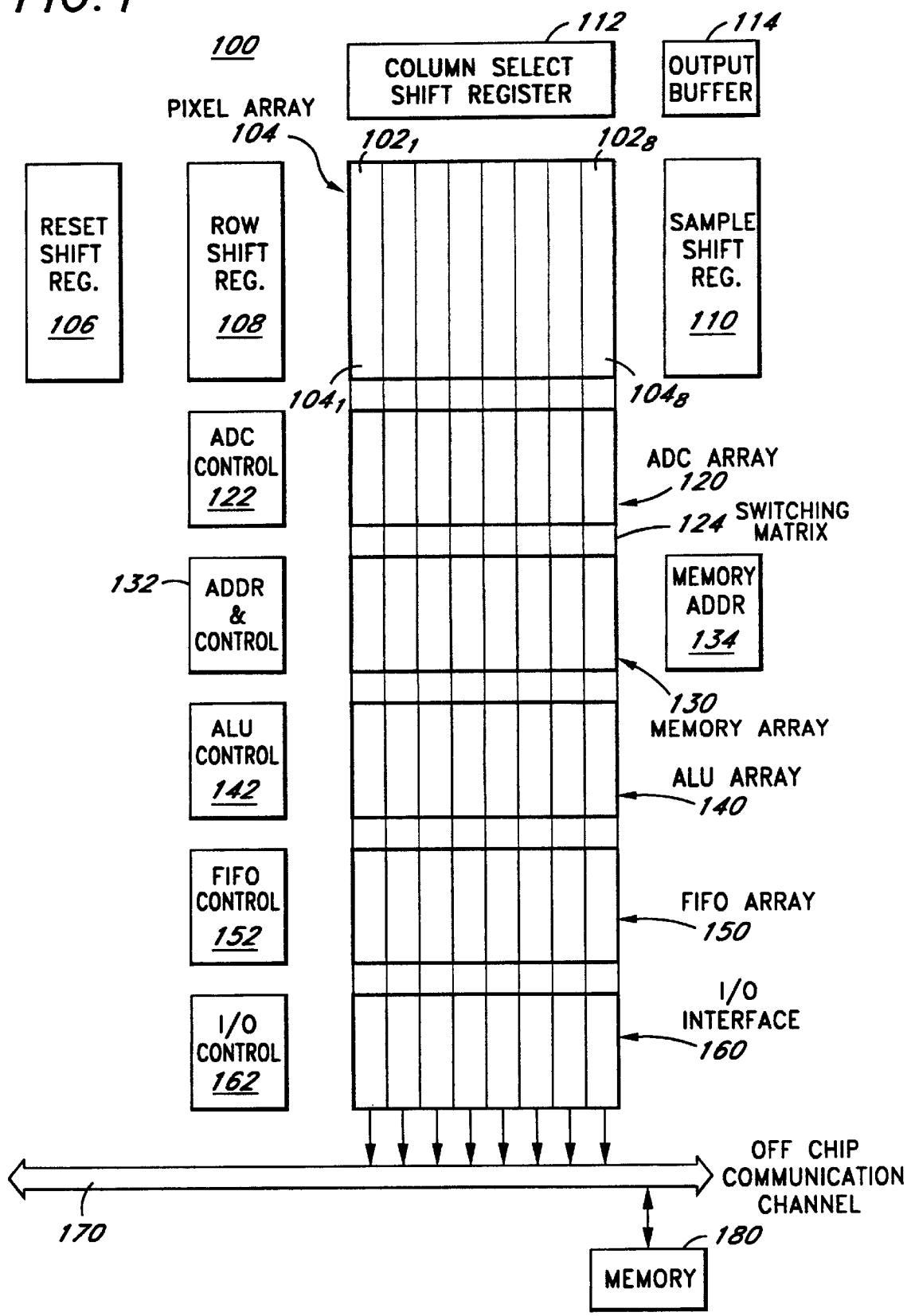
FIG. 1 is a block diagram illustrating a digital camera system, according to one embodiment of the present invention.

FIG. 1 illustrates a digital camera system 100, according to one embodiment of the present invention. Referring to FIG. 1, the digital camera system 100 includes a plurality of block-columns $102_1$–$102_8$ coupled to a bus 170. Although eight block-columns are shown in FIG. 1 (for sake of illustration), N such block-columns may be used, where "N" is a positive whole number. A memory device 180, such as a non-volatile memory, may optionally be connected to the bus 170 for storing data and/or digital representation of images. The bus 170 may also be coupled to an external device such as, for example, a host system, modem, etc. for transmitting data on and/or off the system. The plurality of block-columns $102_1$–$102_8$ integrate on-chip sensing of images and parallel processing of such images to provide a self-contained, high performance system. To achieve such a high performance system, a pixel sensor array and corresponding processing circuitry are implemented on the same substrate, to provide a single chip system.

More specifically, the block-columns $102_1$–$102_8$ comprise corresponding pixel sensor sub-arrays $104_1$–$104_8$, each sensor sub-array includes rows and columns of discrete pixel sensors that capture an image and provide a signal representation in response thereto. In one embodiment, each of the sensor sub-arrays $104_1$–$104_8$ is comprised of an 8×64 array of discrete pixel sensors. With a total of eight block-columns (e.g., $102_1$–$102_8$), the entire array is comprised of 64×64 pixel sensors. It must be noted that the pixel sensor array may be scaled to any configurations such as, for example, a 640×480 video graphics array ("VGA")-type configuration. Moreover, each pixel sensor is a complementary metal-oxide semiconductor ("CMOS") sensor, although other pixel sensor types may be used such as, for example, an active pixel sensor ("APS"). Moreover, each individual pixel sensor occupies an Y by Z area (e.g., 5 $\mu$m×5 $\mu$m), where "Y" and "Z" are positive numbers.

Coupled to the sensor array 104 are a reset shift register 106 used for sequencing through a reset of the sensor array, a row shift register 108 for addressing each row for read-out, a sample shift register 110 for sequencing through the sample signals, and a column shift register 112 used to multiplex the bit lines within the columns of the sensor array. It is to be appreciated that the registers described above are exemplary and may differ depending on the sensor implementation. For example, in one APS array implementation, the sample shift register 110 and the column select shift register 112 may not be needed. An output buffer 114 may optionally be coupled to the sensor array for serially outputting each pixel voltage directly off-chip. In one embodiment, the sensor array 104 may be operated in either a snapshot mode or a pipelined mode (e.g., for video applications). In the snapshot mode, the timing of the image captured by the sensor array is synchronized to a global clock whereas in the pipeline mode, the timing for each row is dependent on the time that the row must be read-out.

Each block-column $102_1$–$102_8$ further comprises an array of analog-to-digital converters ("ADCs") 120 which are coupled to the sensor sub-array 104 in the corresponding block-column. In one embodiment, each block-column includes eight, eight-bit ADCs 120, one for each column of pixel sensors. It is to be appreciated that a different number of ADCs may be used and/or ADCs having a higher or lower resolution (e.g., sixteen bits). The ADCs 120 receive analog values (e.g., a row at a time) from selected pixel sensors of corresponding columns and convert the analog values to digital values. For sake of illustration of the present invention, the following will be described with respect to an eight-bit digital value. ADC control circuitry 122 controls all ADCs 120 in the block-columns in parallel. This type of architecture is referred to as a single instruction, multiple data ("SIMD") architecture. A state machine is used to generate the control signals.

Coupled to the array of ADCs 120 in each block-column 102 is a memory element 130. In one embodiment, the memory element for each block-column comprises an 8×128 bit-memory, although other configurations are possible. With a total of eight block-columns, the total memory size comprises 64×128 bits. The memory element 130 may be comprised of a random access memory ("RAM"), register file, etc. Corresponding control circuitry 132 and 134 are provided for controlling the memory elements in the block-columns. Coupled between the array of ADCs 120 and the memory element 130 in each block-column is a switching matrix 124 that provides spatial rotation of data. The switching matrix 124 will be described in more detail with respect to FIGS. 2 and 3. Each block-column 102 further comprises an arithmetic logic unit ("ALU") 140 that is coupled to the memory element 130 and corresponding ALU control circuitry 142, a first-in first-out ("FIFO") 150 coupled to the ALU 140, and corresponding control circuitry 152, and an input/output (I/O) interface 160 coupled to the FIFO 150.

Figure 2:
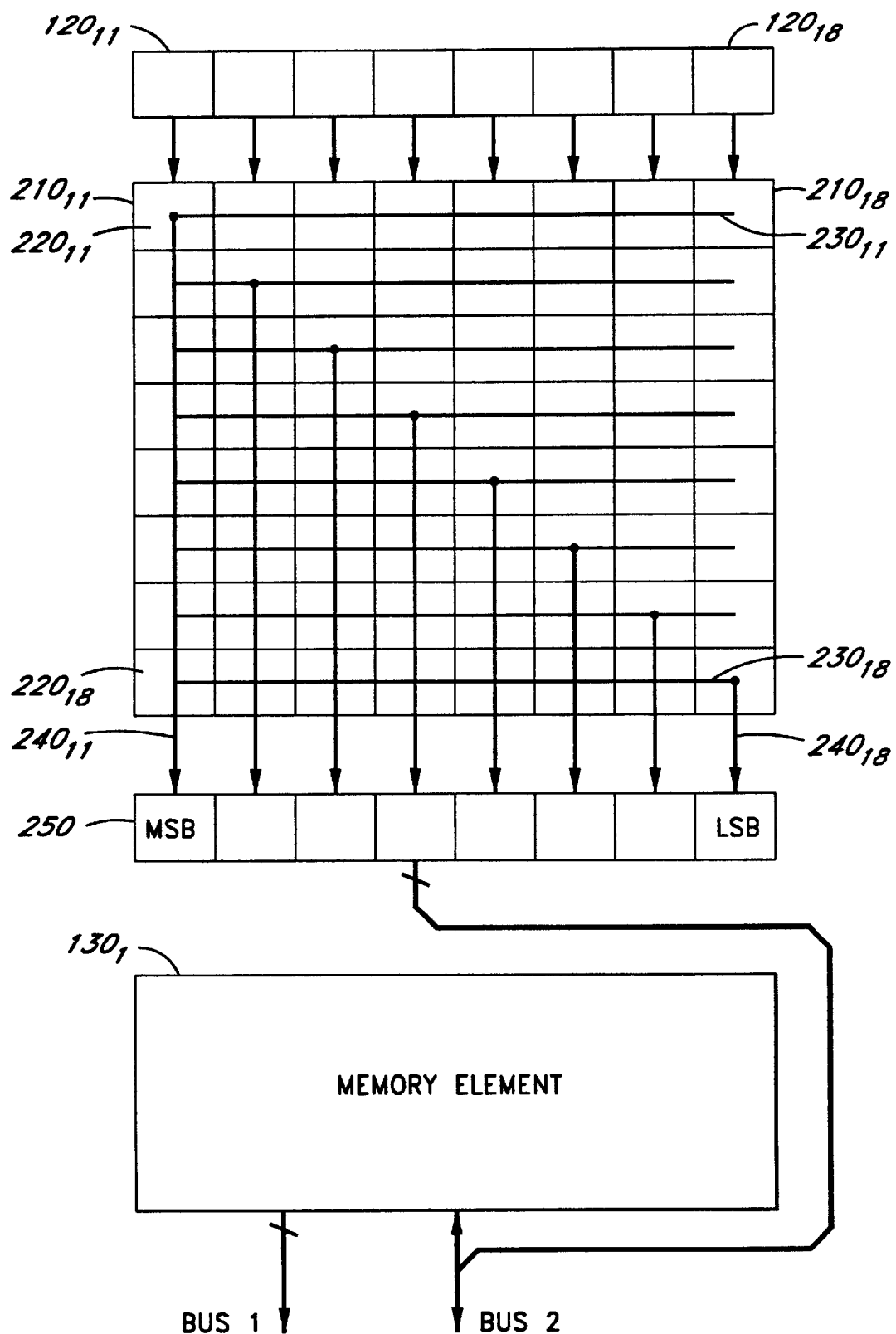
FIG. 2 illustrates the connection between the array of ADCs and the memory element in a block-column, according to one embodiment of the present invention.

FIG. 2 illustrates the connection between the array of ADCs 120 and the memory element 130 in a block-column, according to one embodiment of the present invention. Referring to FIG. 2, the array of ADCs 120 (in block-column $102_1$) comprise ADCs $120_{11}$–$120_{18}$. The eight-bit outputs of ADCs $120_{11}$–$120_{18}$ are latched in corresponding ADC storage elements $210_{11}$–$210_{18}$ (e.g., counter, register, etc.). The ADC storage elements $210_{11}$–$210_{18}$ are arranged vertically such that each eight-bit digital value fits within the pitch of a single pixel column width (e.g., 5 $\mu$m). For example, ADC $120_{11}$ converts an analog sample into a digital value and latches the same into the ADC storage element $210_{11}$, where the most significant bit ("MSB") is designated by numeral $220_{11}$ and the least significant bit ("LSB") is designated by numeral $220_{18}$.

Once the eight-bit digital values are latched into the storage elements $210_{11}$–$210_{18}$, each digital value undergoes a vertical-to-horizontal spatial rotation by way of a switching matrix comprised of row lines $230_{11}$–$230_{18}$ and column lines $240_{11}$–$240_{18}$. The digital values are then latched in an optional holding register 250, where the holding register 250 fits within the pitch of the block-column. In another embodiment, the holding register 250 is not required, in which case the digital values may be directly stored in the memory element $130_1$, transmitted to the ALU via BUS2 (see FIG. 4), etc.

Figure 4:
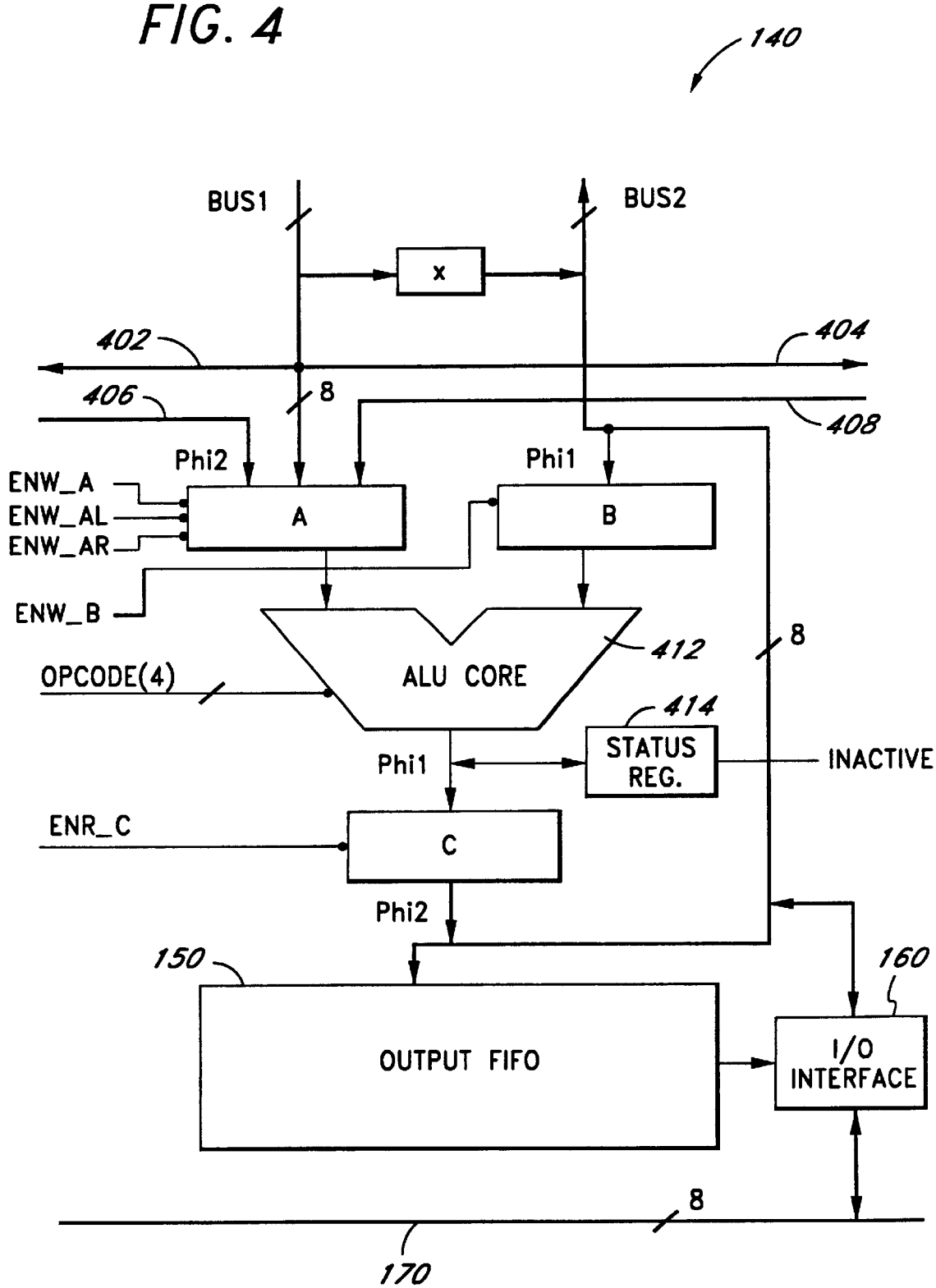
FIG. 4 illustrates an ALU of a block-column, according to one embodiment of the present invention.

The digital values latched into the holding register 250 may be stored in the memory element $130_1$ for further processing. In one embodiment, the memory element $130_1$ is 8 bits wide by 128 bits deep. It is contemplated that the memory elements $130_1$–$130_8$ in the corresponding block-columns $102_1$–$102_8$ may be replaced with a single 64×128 bit memory element. Every bit in the memory element $130_1$ is dual-ported with one read-only port, as shown by BUS1 and one read/write port, as shown by BUS2. The BUS1 and BUS2 outputs are coupled to a corresponding ALU, as shown in FIG. 4. It is to be appreciated that the memory element $130_1$ may include more read and/or write ports.

Figure 3:
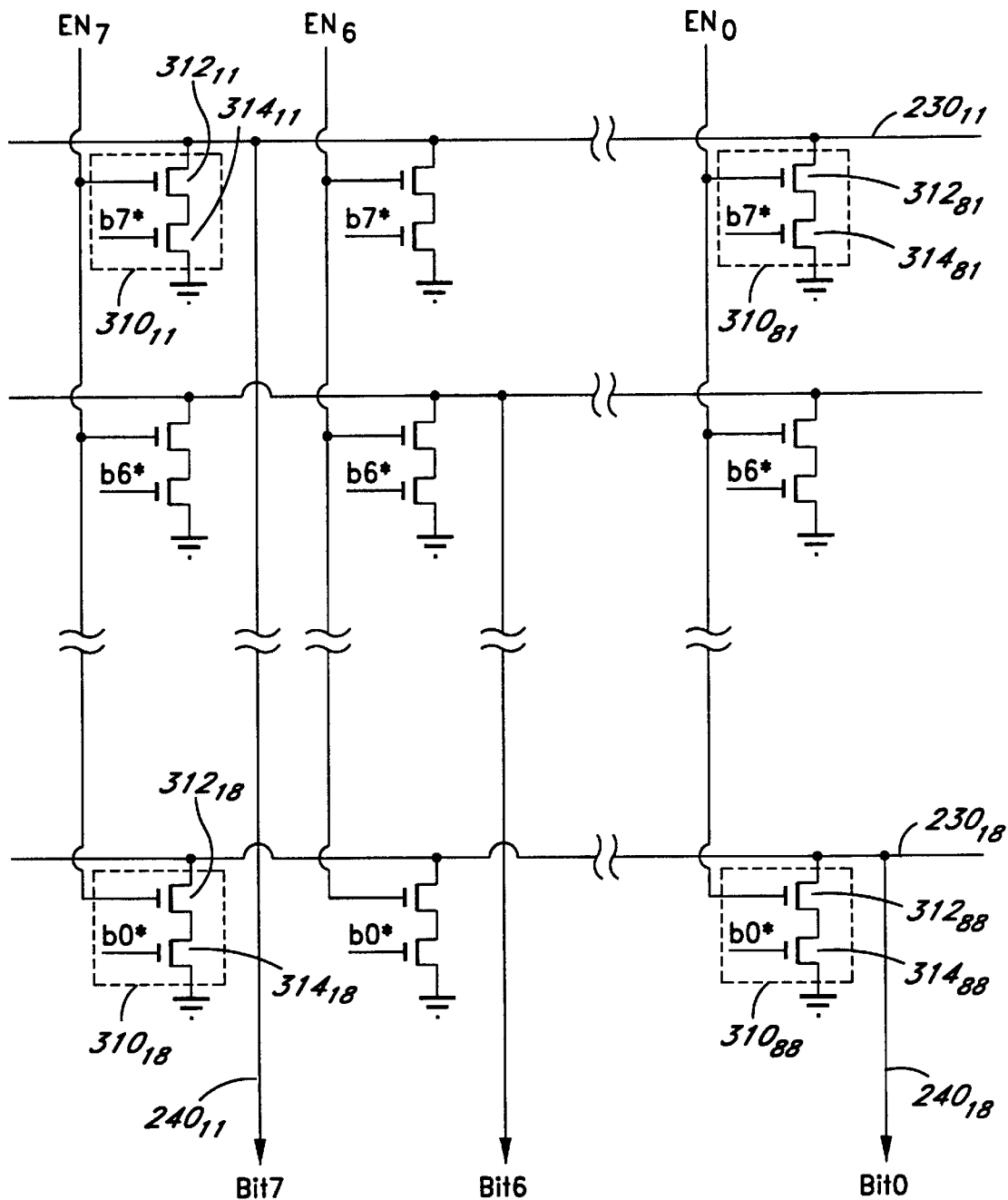
FIG. 3 illustrates an embodiment of the switching matrix, according to one embodiment of the present invention.

FIG. 3 illustrates an embodiment of the switching matrix 124, according to one embodiment of the present invention. It is to be noted that each block-column includes a switching matrix 124. As shown in FIG. 3, the switching matrix 124 comprises an 8×8 array of driving elements $310_{11}$–$310_{88}$, where each driving element includes a select transistor 312 and a driving transistor 314. The column lines $240_{11}$–$240_{18}$ are hard coded to corresponding row lines $230_{11}$–$230_{18}$, i.e., column line $240_{11}$ is hard coded to row line $230_{11}$, . . . , and column line $240_{18}$ is hard coded to row line $230_{18}$. Driving elements in the first row (i.e., $310_{11}$–$310_{18}$) are coupled to the column line $240_{11}$, driving elements in the second row (i.e., $310_{21}$–$310_{28}$) are coupled to the column line $240_{12}$, . . . , and driving elements in the eighth row (i.e., $310_{81}$–$310_{88}$) are coupled to the column line $240_{18}$.

The enable input EN7 is coupled to the gates of select transistors $312_{11}$–$312_{18}$, EN6 is coupled to the gates of select transistors $312_{21}$–$312_{28}$, . . . , and EN0 is coupled to the gates of select transistors $312_{81}$–$312_{88}$. The b7*–b0* inputs coupled to the gates of driving transistors $314_{11}$–$314_{18}$ are the inverted outputs of the eight-bit ADC storage element $210_{11}$, the b7*–b0* inputs coupled to the gates of driving transistors $314_{21}$–$314_{28}$ are the inverted outputs of the eight-bit ADC storage element $210_{12}$, . . . , and the b7*–b0* inputs coupled to the gates of driving transistors $314_{81}$–$314_{88}$ are the inverted outputs of the eight-bit ADC storage element $210_{18}$. The column lines $240_{11}$–$240_{18}$ (bit7–bit0 bus lines) are pre-charged high. The EN7-EN0 inputs are enabled sequentially (one at a time) to coupled the output of the driving transistors in each column to the column lines $240_{11}$–$240_{18}$. For example, if the EN7 input is enabled and the value stored in the eight-bit storage element $210_{11}$ is 80H (i.e., the inverted outputs b7*=0 and b6*–b0*=1), then the driving transistor $314_{11}$ is off to leave the column line $240_{11}$ in the pre-charged, high state, and the driving transistors $314_{12}$–$314_{18}$ are turned on to pull the column lines $240_{12}$–$240_{18}$ low.

FIG. 4 illustrates an exemplary ALU 140 of a block-column (e.g., block-column $102_1$), according to one embodiment of the present invention. Also shown in FIG. 4 is a FIFO 150 and an I/O interface 160 of a block-column. The ALU 140 is an eight-bit ALU which aligns with the eight-column pixel array of a block-column. However, the ALU 140 may be a different bit length. Under the SIMD architecture, all ALUs in the block-columns are synchronized to a single instruction that is generated by the ALU control circuitry 142 of FIG. 1. Thus, each ALU executes the same instruction but on different data.

Referring to FIG. 4, BUS1 is coupled to latch A, and to latch A of adjacent ALUs by way of signal lines 402 and 404, respectively. Similarly, BUS1 of adjacent ALUs are coupled to latch A of ALU 140 by way of signal lines 406 and 408, respectively. BUS2, on the other hand, is coupled to latch B, the output of latch C, the input of the FIFO 150, and the bus 170 via I/O interface 160. This allows data, output from latch C, to be written back to the memory element 130 via BUS2. Moreover, BUS2 allows data from the holding register 250 and/or the memory element 130 (as shown in FIG. 2) to bypass the ALU 140 and be directed to the FIFO 150 and/or the bus 170. The FIFO 150 is arranged in eight-bit wide modules, and may be as deep as needed (e.g., eight digital values deep). The I/O interface 160 and the I/O interface of other block-columns are addressable by the I/O control circuit 162 of FIG. 1, to multiplex the block-column outputs (one at a time) onto the bus 170. The I/O interface 160 also multiplexes between the FIFO output and the ALU 140 output via BUS2 to provide data onto the bus 170.

Exemplary control signals ENW_A, ENW_AL, ENW_AR, ENW_B, OPCODE, and ENR_C are generated by a state machine and are simultaneously applied to all ALUs in the block-columns. The ENW_A signal latches data on BUS1 into latch A, and the ENW_AL and ENW_AR signals latch data on BUS1 of adjacent ALUs by way of signal lines 406 and 408, respectively. The latches A and B are coupled to the ALU core 412 which performs standard operations in response to the OPCODE control signal. Exemplary operations include add, subtract, multiply, divide, compare, and the like. The output of the ALU core 412 is coupled to the output latch C. Each ALU further supports a PASS command which passes the data in latch A, through the ALU core 412 and the output latch C, and onto BUS2. This command is used to move data from an adjacent block-column to the memory element of the current block-column for performing, for example, filtering operations, where the data of a pixel sensor depends on the data of adjacent pixel sensors (which may exist in another block-column).

The ALU 140 includes a status register 414 containing flags such as carry, overflow, sign, and zero. The status register 414 further includes an inactive bit which, when set, locks the memory element $130_1$ of FIG. 2 so that data cannot be read from and/or written to the same. For example, during parallel processing of data, if an ALU reaches a condition where no further processing is required, even though ALUs in other block-columns are continuing to process data, the inactive bit is set to indicate that the ALU is done processing. It is contemplated that other status flags may be provided. Moreover, if the inactive bit is set, the ALU, memory element, and other circuitry may optionally be placed in a power down condition.

Figure 5:
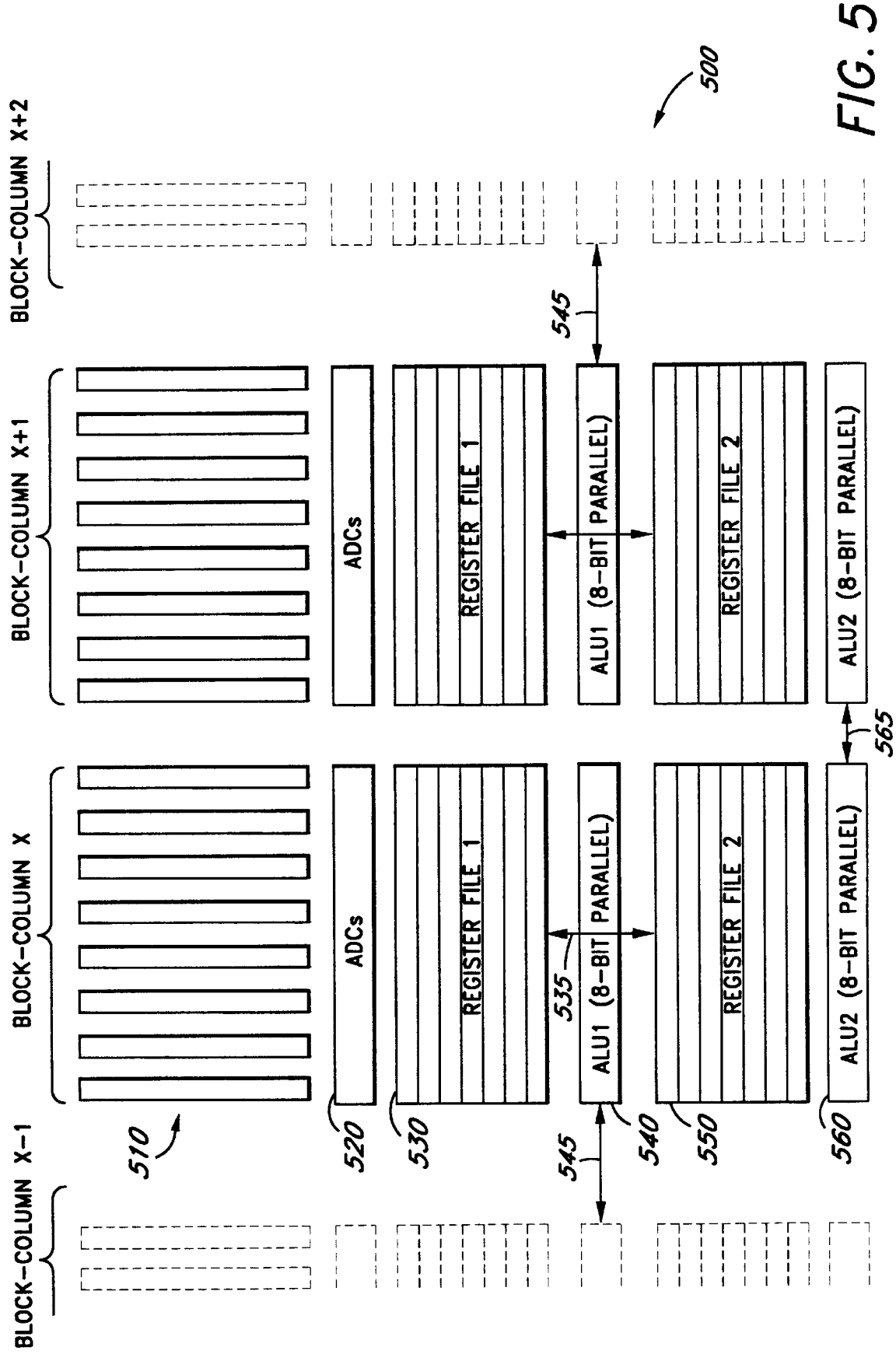
FIG. 5 illustrates a digital camera system, according to another embodiment of the present invention.

FIG. 5 illustrates a digital camera system 500, according to another embodiment of the present invention. In this embodiment, each block-column includes multiple ALUs and multiple memory elements, increasing processing power and parallelism. Referring to FIG. 5, two adjacent block-columns X and X+1 are shown (where "X" is a positive whole number) in addition to portions of block-columns X−1 and X+2. Each block-column includes a sensor sub-array 510 (e.g., 8×64) and an array of ADCs 520, each operating similar to the sensor sub-array 104 and the array of ADCs 120 described with respect to FIGS. 1 and 2. Each block-column further includes a first memory element 530 [hereinafter referred to as "register file1"], a first ALU 540 [hereinafter referred to as "ALU1"], a second memory element 550 [hereinafter referred to as "register file2"], and a second ALU 560 [hereinafter referred to as "ALU2"].

In this implementation, ALU1 operates on data in register file1 and ALU2 operates on data in register file2. As such, before data processing can commence, the data must be placed in the proper register file. The digital values output from the array of ADCs 520 are first placed in register file1, some of which may be destined to register file2. ALU1 supports a special pass command in order to transfer the data from register file1 to register file2, as indicated by arrow 535. Moreover, ALUs in adjacent block-columns communicate in an alternate fashion, allowing transfer of information from adjacent block-columns. In particular, ALU2s in block-columns X and X+1 inter-communicate (similar to that described with respect to FIG. 4) to pass data therebetween, as shown by arrow 565. ALU1s of Block-columns X−1 (partially shown) and X and block-columns X+1 and X+2 (partially shown) inter-communicate to pass data therebetween, as shown by arrows 545. The ALUs in the block-columns typically perform, for example, kernel-based (e.g., filtering) operations in which ALU1 operates on a small array of pixels within the pixel sensor array 510 and ALU2 operates on a different array of pixels. An example is hereinafter described as a further illustration.

Figure 6:
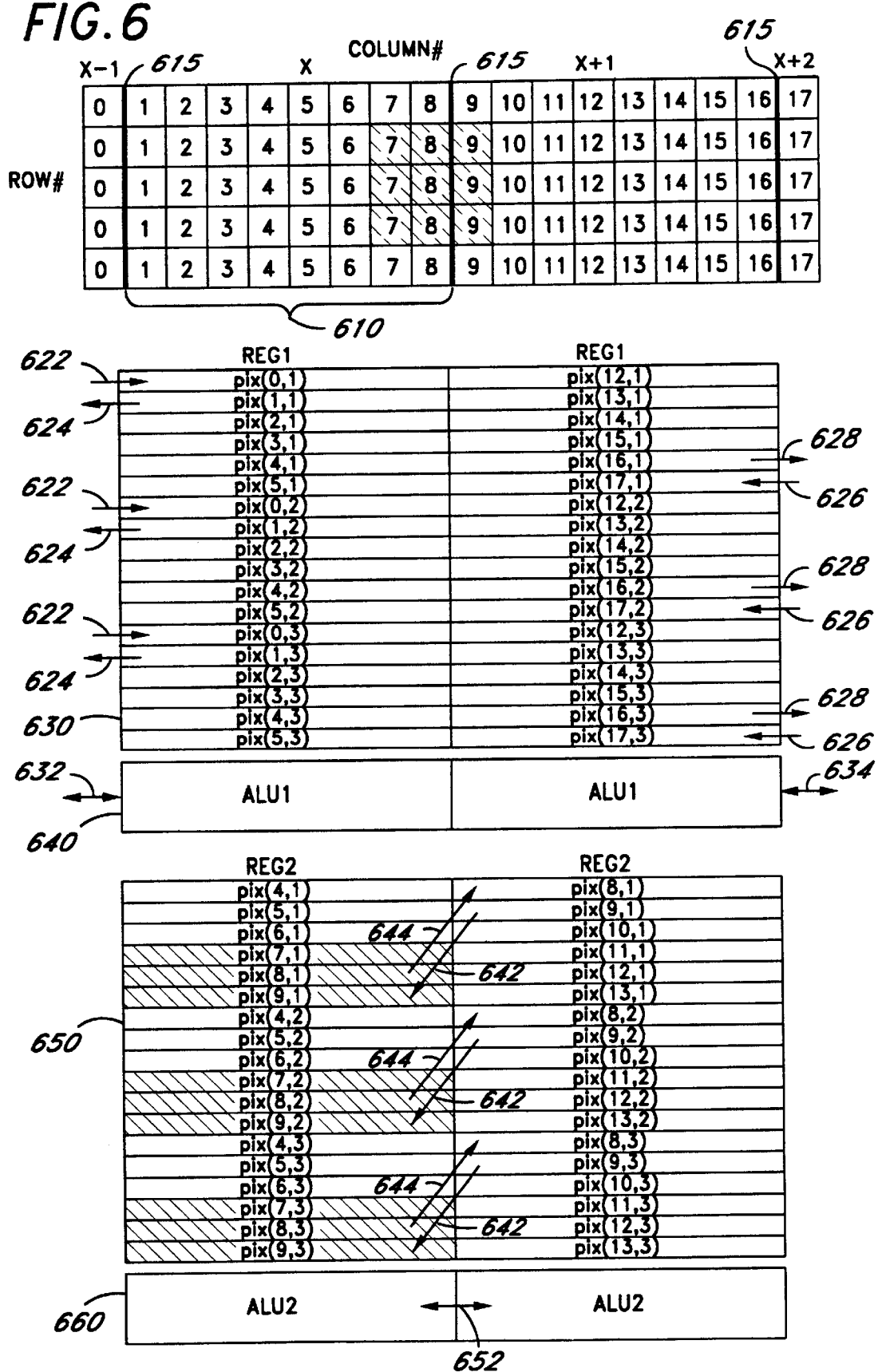
FIG. 6 illustrates an exemplary filtering operation performed by the multiple ALU per block-column implementation of FIG. 5.

FIG. 6 illustrates an exemplary filtering operation performed by the multiple ALU per block-column implementation of FIG. 5. As shown in FIG. 6, block-columns X and X+1 (where X is a positive whole number) each include a pixel sensor sub-array 610 (five rows of which are shown), register file1 630, ALU1 640, register file2 650, and ALU2 660. FIG. 6 also shows the last column of pixel sensors in block-column X−1 and the first column of pixel sensors in block-column X+2. The boundaries between block-columns are designated by numeral 615. The exemplary operation is a simple filtering operation, involving the averaging of nine pixels within each 3×3 filter window, as defined by the following equation:

$$y(m, n) = \frac{1}{9}\sum_{i=-1}^{1}\sum_{j=-1}^{1} x(m+i, n+j),$$

where "x(m,n)" denotes the input pixel value at location (m,n) and "y(m,n)" denotes the computed output pixel value at the same location.

Register file1 of block-column X includes data for computing an output (y) for pixels (1,2), (2,2), (3,2), and (4,2). The output for pixel (1,2) is dependent on data from adjacent pixels, including data from pixels (0,1), (0,2), and (0,3), which are located in block-column X−1. As such, this pixel data must be retrieved from register file1 of block-column X−1 and placed in register file1 of block-column X, as shown by arrows 622. Similarly, the output for pixel (0,2), located in block-column X−1, is dependent on data from pixels (1,1), (1,2), and (1,3), which are located in block-column X. This data is retrieved from register file1 of block-column X and placed in register file1 of block-column X−1, as shown by arrows 624. For both these data transfers, ALU1s of block-columns X and X−1 communicate to transfer data therebetween, as shown by bi-directional arrow 632.

Correspondingly, register file1 of block-column X+1 includes data for computing an output (y) for pixels (13,2), (14,2), (15,2), and (16,2). The output for pixel (16,2) is dependent on data from neighboring pixels, including pixels (17,1), (17,2), and (17,3), which are located in block-column X+2. Therefore, the pixel data must be retrieved from register file1 of block-column X+2 and placed in register file1 of block-column X+1, as shown by arrows 626. Similarly, the output for pixel (17,2), located in block-column X+2, is dependent on data from pixels (16,1), (16,2), and (16,3), which are located in block-column X+1. This data is retrieved from register file1 of block-column X+1 and placed in register file1 of block-column X+2, as shown by arrows 628. For both these data transfers, ALU1s of block-columns X+1 and X+2 communicate to transfer data therebetween, as shown by bi-directional arrow 634.

Register file2 of block-column X includes data for computing an output (y) for pixels (5,2), (6,2), (7,2), and (8,2). The output for pixel (8,2) is dependent on data from neighboring pixels (see shaded area), including data from pixels (9,1), (9,2), and (9,3), which are located in block-column X+1. This pixel data is retrieved from register file2 of block-column X+1 and placed in register file2 of block-column X, as shown by arrows 642. Register file2 of block-column X+1 includes data for computing an output (y) for pixels (9,2), (10,2), (11,2), and (12,2). The output for pixel (9,2) is dependent on neighboring pixels, including data from pixels (8,1), (8,2), and (8,3) located in block-column X. This data is retrieved from register file2 of block-column X and stored in register file2 of block-column X+1, as shown by arrows 644. For both these data transfers, ALU2s of block-columns X and X+1 communicate to transfer data therebetween, as shown by bidirectional arrow 652. This type of "zigzag" communication between block-columns provides an efficient manner of grouping data for performing various filtering operations.

The digital camera system of the present invention performs various operations, such as for example, median filtering, digital convolutions, edge detection, data compression, color interpolation, white color balancing, color conversions, and pre-processing operations (e.g., pattern recognition, gesture recognition, and the like). Additionally, the digital camera system provides image enhancement, adjustment for fixed pattern noise, and performs color interpolation.

The advantages of the present invention include on-chip integration of sensors and processing circuitry, capability to compute global image capture measures for analysis of sensor fidelity, scalability where more ALUs may be added for higher parallelism, improved layout and wiring of the ALU structure by providing a switching matrix, and the ability to process larger filter windows without incurring a large time penalty.

Moreover, the digital camera system reduces necessary bandwidth for off-chip communication by extracting information, thus also reducing storage requirements for portable camera systems. The high-speed parallel processing enables pre-processing of images that is transparent to the user (e.g., as the image is scanned from the pixel array). For image enhancement, the data format coming off chip is the same as any other image. For more elaborate processing operations, the output data may represent, for example, intensity values, gradients, segmentation, object correlation, and the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A digital camera system comprising:
   a sensor array that comprises at least two sensor sub-arrays including discrete sensor elements;
   analog-to-digital converters to convert analog values into digital data, each coupled to a corresponding sensor sub-array;
   a storage element coupled to the analog-to-digital converters; and
   a switching matrix coupled to the storage element to provide spatial rotation of the digital data, the switching matrix comprises an array of driving elements each driving element including a select transistor and a driving transistor.

2. The digital camera system of claim 1 further comprising a memory element coupled to the switching matrix.

3. The digital camera system of claim 2, wherein the storage element includes a plurality of digital storage elements corresponding to the analog-to-digital converters and being implemented to fit within a pitch of a column.

4. The digital camera system of claim 1 further comprising a plurality of arithmetic logic units coupled to the storage element.

5. The digital camera system of claim 2, wherein the switching matrix further includes a plurality of column lines, each uniquely coupled to one of a plurality of row lines so that the driving elements of a row are coupled to one of the plurality of column lines.

6. The digital camera system of claim 4 wherein each arithmetic logic unit is coupled to adjacent arithmetic logic units to pass data therebetween.

7. The digital camera system of claim 4 further comprising a first-in first-out device coupled to receive the output of one or more arithmetic logic units.

8. The digital camera system of claim 7 further comprising an input/output interface coupled to at least the first-in first out device.

9. A digital camera system, comprising:
   a plurality of block-columns, each including,
   rows and columns of pixel sensor elements, the pixel sensor elements to capture an image and provide a signal representation thereof,
   analog-to-digital converters, each coupled to a corresponding column of sensor elements, each analog-to-digital converter to provide a digital value, responsive to the outputs of the sensor elements,
   a switching matrix coupled to the analog-to-digital converters, the switching matrix to provide spatial rotation of the digital data, the switching matrix including an array of driving elements each driving element including a select transistor and a driving transistor, and
   an arithmetic logic unit coupled to the switching matrix.

10. The digital camera system of claim 9 wherein each block-column further comprises a memory element coupled to the switching matrix and the arithmetic logic unit, the memory element to receive the spatially rotated digital data from the switching matrix.

11. The digital camera system of claim 9 wherein the analog-to-digital converters for each block-column further comprise a first storage element including storage registers coupled to receive the digital data from the switching matrix, the storage registers being implemented to fit within a pitch of a column.

12. The digital camera system of claim 11 wherein each storage register corresponds to one of the analog-to-digital converters.

13. The digital camera system of claim 9 wherein the pixel sensor elements are complementary metal-oxide semiconductor elements.

14. The digital camera system of claim 10 wherein the arithmetic logic unit in each block-column is coupled to arithmetic logic units in adjacent block-columns to pass data therebetween.

15. The digital camera system of claim 10 wherein each block-column further comprises a first-in first-out device coupled to receive an output of the arithmetic logic unit.

16. The digital camera system of claim 10 wherein each block-column further comprises a second memory element and a second arithmetic logic unit.

17. The digital camera system of claim 16 wherein the arithmetic logic units of a first set of adjacent block-columns are coupled together and the second arithmetic logic units of a second set of adjacent block-columns are coupled together, wherein the first and second sets of adjacent block-columns are different.

18. The digital camera system of claim 9 further comprising control circuitry, said control circuitry to control the block-columns in parallel.

19. A method, comprising:
   providing rows and columns of discrete sensor elements, to capture an image and provide an analog representation thereof;
   converting the analog representations corresponding to each column into digital values;
   spatial rotating the digital values through an array of driving elements each including a select transistor and a driving transistor;

storing the rotated digital values; and operating on the rotated digital values in parallel to provide an output image.

20. A digital camera system, comprising:

a sensor array including rows and columns of discrete sensor elements;

analog-to-digital converter means coupled to a corresponding column of sensor elements, for converting analog values into digital data;

storage means coupled to the analog-to-digital converter means, for storing the digital data;

switching means coupled to the storage means for spatially rotating the digital data, the switching means including an array of driving elements each driving element including a select transistor and a driving transistor; and first arithmetic logic unit means for performing operations on the spatially rotated digital data.

21. The digital camera system of claim 20, wherein the storage means being implemented to fit within a pitch of a column.

22. The digital camera system of claim 20 wherein the first arithmetic logic unit means is coupled to an adjacent second arithmetic logic unit means for transferring data therebetween.

23. The digital camera system of claim 2 being integrated on a single integrated circuit chip.

24. The digital camera system of claim 9 being integrated on a single integrated circuit chip.

25. The digital camera system of claim 21 being integrated on a single integrated circuit chip.

* * * * *

UNITED STATES PATENT AND TRADEMARK OFFICE
CERTIFICATE OF CORRECTION

PATENT NO.     : 6,573,936 B2
DATED          : June 3, 2003
INVENTOR(S)    : Morris et al.

It is certified that error appears in the above-identified patent and that said Letters Patent is hereby corrected as shown below:

<u>Title page,</u>
Item [57], ABSTRACT,
Line 10, delete "Which", insert -- which --.

Signed and Sealed this

Thirtieth Day of September, 2003

JAMES E. ROGAN
*Director of the United States Patent and Trademark Office*